United States Patent
He et al.

(10) Patent No.: US 8,768,080 B2
(45) Date of Patent: Jul. 1, 2014

(54) CODING OF RESIDUAL DATA IN PREDICTIVE COMPRESSION

(75) Inventors: Dake He, Waterloo (CA); Jin Meng, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 67 days.

(21) Appl. No.: 13/334,345

(22) Filed: Dec. 22, 2011

(65) Prior Publication Data
US 2012/0170857 A1 Jul. 5, 2012

Related U.S. Application Data

(60) Provisional application No. 61/429,631, filed on Jan. 4, 2011.

(51) Int. Cl.
*G06K 9/36* (2006.01)

(52) U.S. Cl.
USPC ........... 382/233; 382/232; 382/240; 382/236; 382/250; 382/251

(58) Field of Classification Search
USPC ......... 382/232, 233, 236, 238, 247, 248, 244, 382/245, 250, 251; 375/122, 240.03, 375/240.12, 240.25, 240.16; 708/203; 345/555; 348/384.1, 87; 358/426.01, 358/426.16
See application file for complete search history.

(56) References Cited

U.S. PATENT DOCUMENTS

| | | | |
|---|---|---|---|
| 2003/0081850 A1 | 5/2003 | Karczewicz et al. | |
| 2006/0232454 A1 | 10/2006 | Cha et al. | |
| 2007/0280350 A1 * | 12/2007 | Mathew et al. | 375/240.03 |
| 2008/0013633 A1 | 1/2008 | Ye et al. | |
| 2008/0310504 A1 | 12/2008 | Ye et al. | |
| 2009/0161759 A1 * | 6/2009 | Seo et al. | 375/240.12 |
| 2009/0324112 A1 * | 12/2009 | Park | 382/233 |
| 2010/0284462 A1 | 11/2010 | Ye et al. | |
| 2011/0200104 A1 * | 8/2011 | Korodi et al. | 375/240.12 |

FOREIGN PATENT DOCUMENTS

WO    WO2010091503    8/2010

OTHER PUBLICATIONS

Elias, Peter, "Predicitive Coding—Part 1," IRE Transactions—Information Theory, Mar. 1955, pp. 16-24.
Marpe, Detlev, "Context-Based Adaptive Binary Arithmetic Coding in the H.264/AVC Video Compression Standard," IEEE Transactions on Circuits and Systems for Video Technology, vol. 13, No. 7, Jul. 2003, pp. 620-636.
Mrak, Marta, et al., "A Context Modeling Algorithm and its Application in Video Compression," ICIP 2003, Sep. 14-17, pp. 1-4.
International Search Report and Written Opinion of the International Searching Authority issued in International Application PCT/CA2011/050805 on Mar. 13, 2012; 8 pages.
International Search Report and Written Opinion of the International Searching Authority issued in International Application PCT/CA2011/050803 on Mar. 23, 2012; 8 pages.

* cited by examiner

*Primary Examiner* — Ali Bayat
(74) *Attorney, Agent, or Firm* — Fish & Richardson P.C.

(57) ABSTRACT

Encoding input data includes: generating a first block of coefficients based on a transform performed on a residual block of data for multiple pixels; generating reference information based on a reference block of data corresponding to the residual block of data; and determining losslessly decodable code values representing the first block of coefficients based on the reference information.

15 Claims, 9 Drawing Sheets

US 8,768,080 B2

CODING OF RESIDUAL DATA IN PREDICTIVE COMPRESSION

CROSS-REFERENCE TO RELATED APPLICATIONS

This application claims priority to U.S. Application Ser. No. 61/429,631, filed on Jan. 4, 2011, incorporated herein by reference.

FIELD

The present application generally relates to coding and decoding media data (e.g., video and image coding and decoding), and in particular to techniques for coding of residual data in predictive compression.

BACKGROUND

Some standards for encoding and decoding videos (e.g., ITU-T H.264/AVC video coding standard) use block-based coding processes. In these processes, to compress a video sequence, which consists of several frames of pictures, a frame is divided into blocks (e.g., 4×4, 8×8, 16×16, 32×32, or 64×64 blocks of pixel data). In this way, the task of coding the whole video sequence is broken down into coding each block, where blocks within a frame are coded in a certain order (e.g., raster order). The process of coding a block includes performing a transform (e.g., the discrete cosine transform (DCT)). In many cases, the data being transformed is not the actual pixel data, but is residual data following a prediction operation. For example, to code a particular block of pixels (called the "current block"), a prediction of the same size (called the "reference block") is derived based on reconstruction of a block that was already coded according to the coding order. The reference block can come from a different frame (called "inter prediction") or the same frame (called "intra prediction"). A residual block is obtained by subtracting the reference block from current block. Each residual block is transformed into a block of transform coefficients, the transform coefficients are optionally quantized, and the (possibly quantized) transform coefficients are entropy encoded, yielding a bitstream. Decoding is performed using an inverse procedure including entropy decoding the bitstream, and de-quantizing and inverse transforming to recover the residual block. The reference block that was used to generate the residual block at the encoder can also be recovered at the decoder using previously decoded data. Then the current block is reconstructed by adding the residual block to the reference block.

The overall encoding/decoding procedure may result in lossy compression/decompression of the video data (e.g., if quantization is involved), however, the entropy encoding/decoding portion of the overall procedure is lossless. In the AVC standard, two entropy coding methods are employed in the block-wise prediction coding architecture described above: one is called context-adaptive binary arithmetic coding (CABAC) and the other one is called context-adaptive variable length coding (CAVLC).

DESCRIPTION

The term "comprising" and variations thereof as used herein are used synonymously with the term "including" and variations thereof and are open, non-limiting terms.

Figure 1:
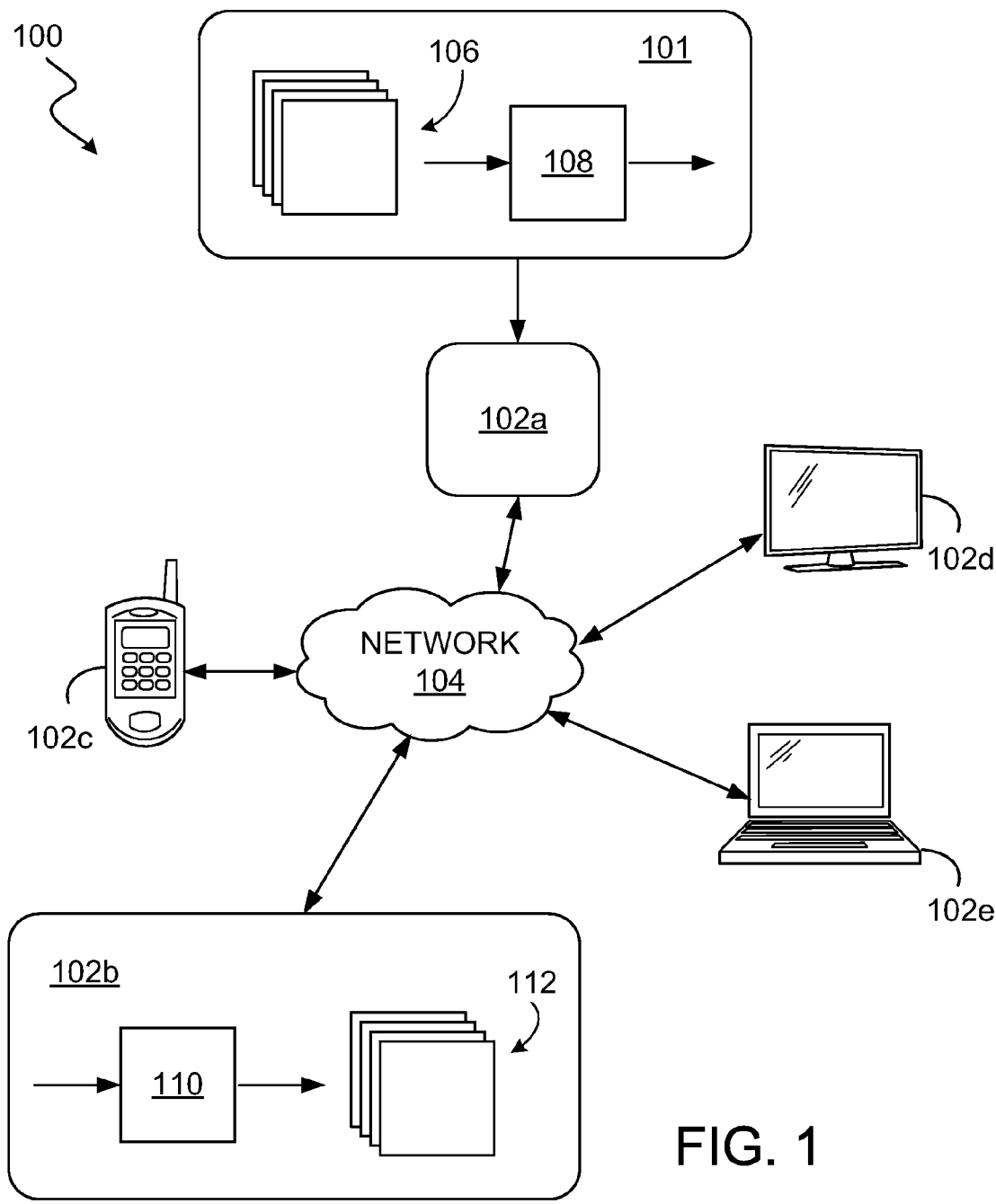
FIG. 1 is a block diagram of an exemplary communication system.

FIG. 1 shows an exemplary system 100 for communicating data, including image, video, or other media data, between one or more nodes 101, 102a-102e connected over a network 104. In this example, a node 101 receives a sequence of frames 106 from one or more sources (not shown) such as a video camera or a video stored in a storage medium, or any other source that can detect, derive, capture, store or record visual information such as video or images. In some implementations, the sources may be in communication with the node 101, or may be a part of the node 101. The node 101 includes an encoder module 108 that encodes the frames 106 to generate a stream or file of encoded video data. In this example, the encoded video data is provided to a node 102a coupled to the network 104. Alternatively, the node 101 may itself be coupled to the network 104, or the encoded video data may also or alternatively be stored locally for later transmission or output, such as in a non-volatile memory or other storage medium.

The node 102a transmits the encoded video data (e.g., as a stream or a file) to any of a variety of other nodes 102b-102e (e.g., a mobile device, a television, a computer, etc.) coupled to the network 104. The node 102a can include a transmitter configured to optionally perform additional encoding (e.g., channel coding such as to forward error-correction coding) and to modulate the data onto signals to be transmitted over the network 104. The node 102b receives and demodulates the signals from the network 104 to recover the encoded video data. The node 102b includes a decoder module 110 that decodes the encoded video data and generates a sequence of reconstructed frames 112. In some implementations, the node 102b may include a display for rendering the reconstructed frames 112. The node 102b may include a storage medium to store the encoded video data for later decoding including at a time when the node 102b is not coupled to the network 104.

The network 104 may include any number of networks interconnected with each other. The network 104 may include any type and/or form of network(s) including any of the following: a wide area network (such as the Internet), a local area network, a telecommunications network, a data communication network, a computer network, a wireless network, a wireline network, a point-to-point network, and a broadcast network. The network may include any number of repeaters, appliances, devices, servers, storage media and queues.

In the description that follows, example embodiments are described with reference to two-dimensional video coding/decoding, however, the techniques may also be applicable to image coding/decoding, video coding/decoding that includes additional views or dimensions, including multiview video coding (MVC) and three-dimensional (3D) video, extensions of video coding/decoding schemes such as scalable video coding (SVC), and other media coding/decoding schemes that use entropy coding/decoding with different contexts associated with different portions of the data. For example, for any type of residual data predicted from reference data, the techniques for determining a reference data dependent context for entropy coding/decoding of a portion of the residual data can be applied for a variety of different uses of the context in the entropy coding process.

In the description that follows, the terms frame and slice are used somewhat interchangeably. For example, in the case of the H.264 standard, a frame may contain one or more slices. It will also be appreciated that certain encoding/decoding operations are performed on a frame-by-frame basis and some are performed on a slice-by-slice basis, depending on the particular requirements of the applicable video coding standard. In any particular embodiment, the applicable video coding standard may determine whether the operations described below are performed in connection with frames and/or slices, as the case may be.

Figure 2A:
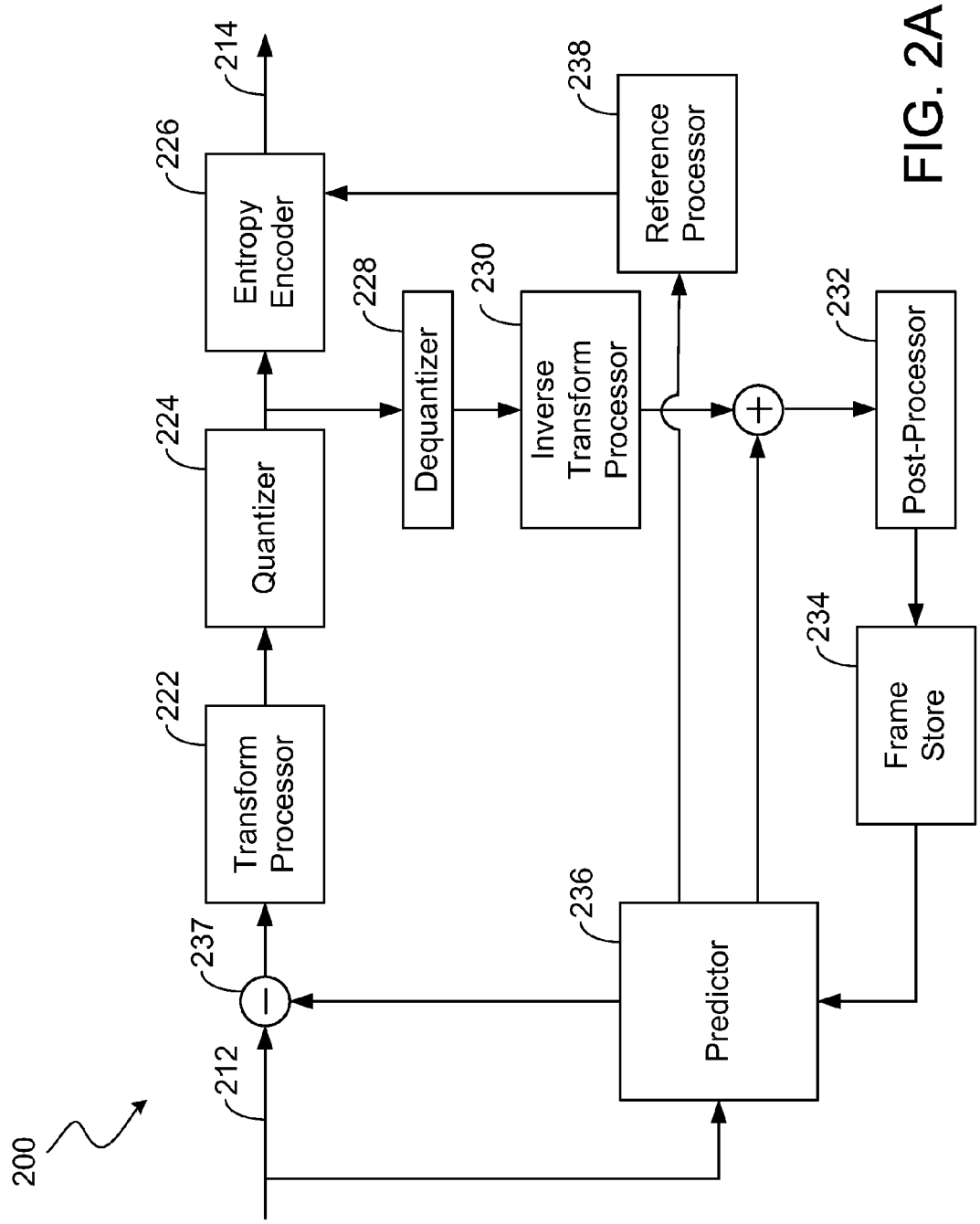
FIG. 2A is a block diagram of an exemplary video encoder.
Figure 2B:
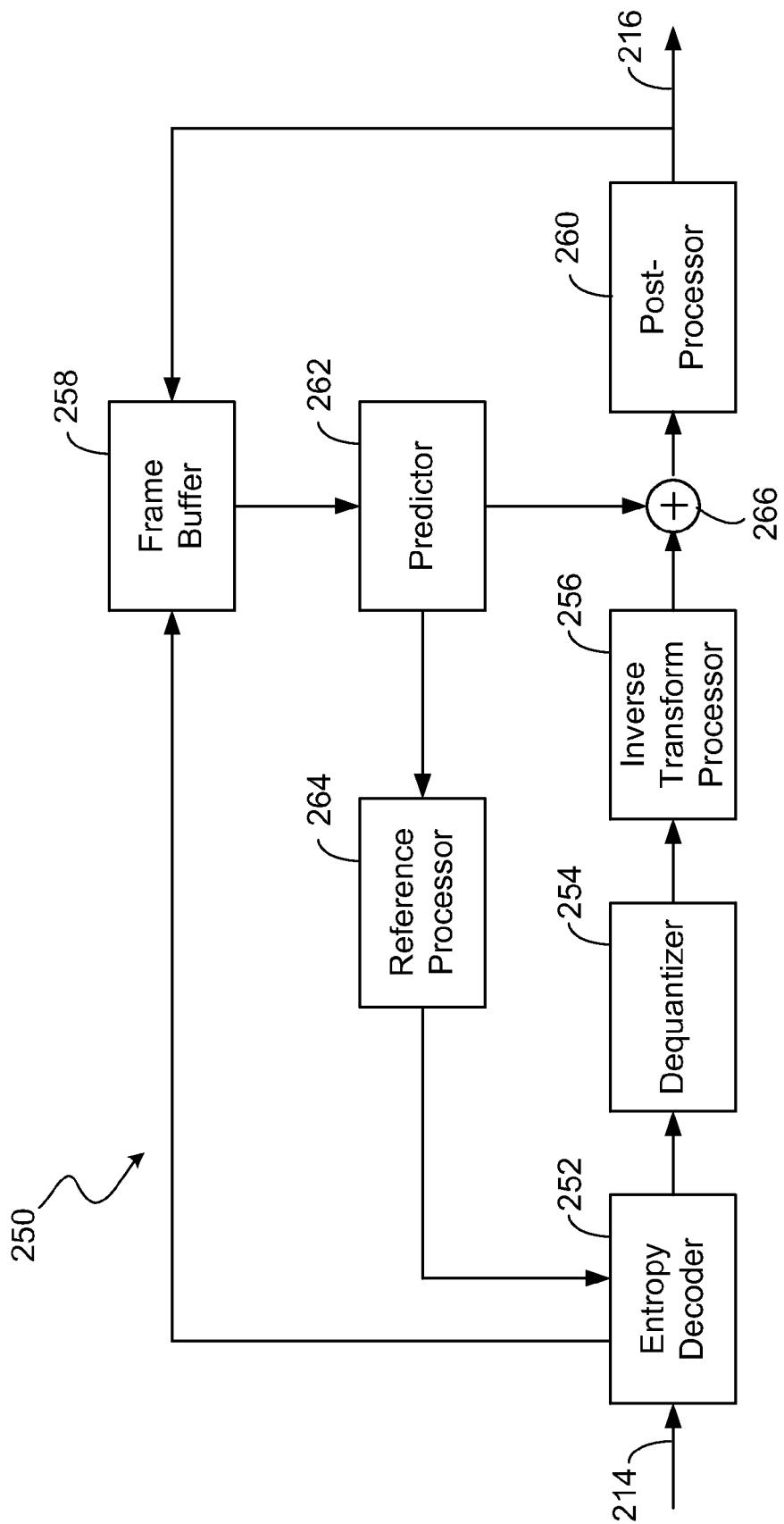
FIG. 2B is a block diagram of an exemplary video decoder.

Reference is now made to FIG. 2A, which shows a block diagram of an encoder 200 for encoding video. Reference is also made to FIG. 2B, which shows a block diagram of a decoder 250 for decoding video. It will be appreciated that the encoder 200 and decoder 250 described herein may each be implemented on an application-specific or general purpose computing device, containing one or more processing elements and memory. The operations performed by the encoder 200 or decoder 250, as the case may be, may be implemented by way of application-specific integrated circuit, for example, or by way of stored program instructions executable by a general purpose processor. The device may include additional software, including, for example, an operating system for controlling basic device functions.

The encoder 200 receives input data 212 from a source (e.g., a video source) and produces an encoded bitstream 214. The decoder 250 receives the encoded bitstream 214 (as input data for the decoder 250) and outputs a decoded video frame 216. The encoder 200 and decoder 250 may be configured to operate in conformance with a number of video compression standards. For example, the encoder 200 and decoder 250 may be H.264/AVC compliant. In other embodiments, the encoder 200 and decoder 250 may conform to other video compression standards, including evolutions of the H.264/AVC standard such as the High Efficiency Video Coding (HEVC) standard.

The encoder 200 includes a transform processor 222, a quantizer 224, and an entropy encoder 226. The input data 212 includes frames of spatial domain data where each frame is organized, for example, as blocks of pixel data, which may further be organized as "macroblocks" or "coding units" that are made up of multiple blocks of pixel data. The blocks of pixel data each comprise a two-dimensional array of pixel data where each pixel represents a value (e.g., a luminance value that represents an overall intensity, or a chrominance value that includes color information). The transform processor 222 performs a transform upon the spatial domain data. In particular, the transform processor 222 applies a block-based transform to convert spatial domain data (in a spatial domain with dimensions x and y) to spectral components in a transform domain (with dimensions $f_x$ and $f_y$ that represent spatial frequencies). For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes (e.g., 16×16, 32×32, or 64×64 blocks, or rectangular blocks having different numbers of pixels in the x and y dimensions in the spatial domain, and different numbers of coefficients in the $f_x$ and $f_y$ dimensions in the transform domain).

Applying the block-based transform to a block of pixel data results in a set of transform domain coefficients. A "set" in this context is an ordered set in which the coefficients have coefficient positions (in the transform domain with dimensions $f_x$ and $f_y$). In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The block of transform domain coefficients is quantized by the quantizer 224. The quantized coefficients and associated information are then encoded by the entropy encoder 226.

A predictor 236 provides a reference block for performing prediction by subtracting the reference block from a current block of the input data 212 being encoded. The predictor 236 includes a module to determine the appropriate coding mode, for example, whether the frame/slice being encoded is of I, P, or B type. Intra-coded frames/slices (i.e., type I) are encoded without reference to other frames/slices. In other words, they do not employ temporal prediction. However intra-coded frames do rely upon spatial prediction within the frame/slice. That is, when encoding a particular block the data in the block may be compared to the data of nearby pixels within blocks already encoded for that frame/slice to find a similar reference block. Using a difference processor 237 (e.g., subtraction of respective pixel values), the pixel data of the reference block is subtracted from the pixel data of the current block to generate a block of residual data. The transform processor 222 then converts the residual data into coefficients in the transform domain. H.264, for example, prescribes nine spatial prediction modes for 4×4 transform blocks, and HEVC prescribes additional spatial prediction modes. In some embodiments, multiple of the modes may be used to independently process a block, and then rate-distortion optimization is used to select the best mode.

Motion prediction/compensation enables the encoder 200 to take advantage of temporal prediction. Accordingly, the encoder 200 has a feedback loop that includes a de-quantizer 228, an inverse transform processor 230, and a post-processor 232. These elements mirror the decoding process implemented by the decoder 250 to reproduce the frame/slice. A frame store 234 is used to store the reproduced frames. In this manner, the motion prediction is based on what will be the reconstructed frames at the decoder 250 and not on the original frames, which may differ from the reconstructed frames due to the lossy compression involved in encoding/decoding. When performing motion prediction/compensation, the predictor 236 uses the frames/slices stored in the frame store 234 as source frames/slices for comparison to a current frame for the purpose of identifying similar blocks. Accordingly, for blocks to which motion prediction is applied, the "source data" which the transform processor 222 encodes is the residual data that comes out of the motion prediction process. For example, it may include information regarding the reference frame, a spatial displacement or "motion vector," and residual pixel data that represents the differences (if any) between the reference block and the current block. Information regarding the reference frame and/or motion vector is not necessarily processed by the transform processor 222 and/or quantizer 224, but instead may be supplied to the entropy encoder 226 for encoding as part of the bitstream along with the quantized coefficients.

The encoder 200 also includes a reference processor 238 that aids the entropy encoder 226 in generating a bitstream 214 that is more efficiently compressed than it would be without it. For example, in some implementations, the reference processor 238 processes the reference block that was used to generate a particular residual block and provides reference information that the entropy encoder 226 uses to categorize different contexts in a context model according to spectral properties of the reference block (e.g., in addition to a spectral position within a transform of the residual block), as described in more detail below with reference to FIGS. 3A and 3B. By providing multiple contexts for a given residual block spectral position, the entropy encoding can be performed more efficiently. For example, in the case of an arithmetic code, the estimated probabilities provided by different contexts can be estimated more accurately by accounting for different characteristics that are evident from the reference block. In the case of a Huffman code, the different sets of codewords (called "codes") provided by different contexts can be selected in a more customized way to account for different characteristics that are evident from the reference block.

The decoder 250 includes an entropy decoder 252, dequantizer 254, inverse transform processor 256, and post-processor 260. A frame buffer 258 supplies reconstructed frames for use by a predictor 262 in applying spatial prediction and motion compensation. The addition processor 266 represents the operation of recovering the video data for a particular reconstructed block to be supplied to the post-processor 260 from a previously decoded reference block from the predictor 262 and a decoded residual block from the inverse transform processor 256.

The bitstream 214 is received and decoded by the entropy decoder 252 to recover the quantized coefficients. Side information may also be recovered during the entropy decoding process, some of which may be supplied to the motion compensation loop for use in motion compensation, if applicable. For example, the entropy decoder 252 may recover motion vectors and/or reference frame information for inter-coded macroblocks. In the process of performing entropy decoding, the decoder 250 also uses information from a reference processor 264 to provide the same reference information that was used in the encoder 200, which enables the entropy decoder 252 to assign contexts in the same way as the encoder 200, for example, to adaptively estimate the same probabilities that were used to encode symbols in the encoder in the case of arithmetic coding, or to apply the same code in the case of Huffman coding.

The quantized coefficients are then dequantized by the dequantizer 254 to produce the transform domain coefficients, which are then subjected to an inverse transform by the inverse transform processor 256 to recreate the "video data." In some cases, such as with an intra-coded macroblock, the recreated "video data" is the residual data for use in spatial compensation relative to a previously decoded block within the frame. The decoder 250 generates the video data from the residual data and pixel data from a previously decoded block. In other cases, such as inter-coded macroblocks, the recreated "video data" from the inverse transform processor 256 is the residual data for use in motion compensation relative to a reference block from a different frame.

When performing motion compensation, the predictor 262 locates a reference block within the frame buffer 258 specified for a particular inter-coded macroblock. It does so based on the reference frame information and motion vector specified for the inter-coded macroblock. It then supplies the reference block pixel data for combination with the residual data to arrive at the recreated video data for that macroblock.

Post-processing may then be applied to a reconstructed frame/slice, as indicated by the post-processor 260. For example, the post-processing can include deblocking. Certain types of post-processing are optional and in some cases the post-processor operates in a bypass mode to provide reconstructed data without any post-processing (e.g., deblocking may not be necessary after spatial compensation). After post-processing, the frame/slice is output as the decoded video frame 216, for example for display on a display device. It will be understood that the video playback machine, such as a computer, set-top box, DVD or Blu-Ray player, and/or mobile handheld device, may buffer decoded frames in a memory prior to display on an output device.

Figure 3A:
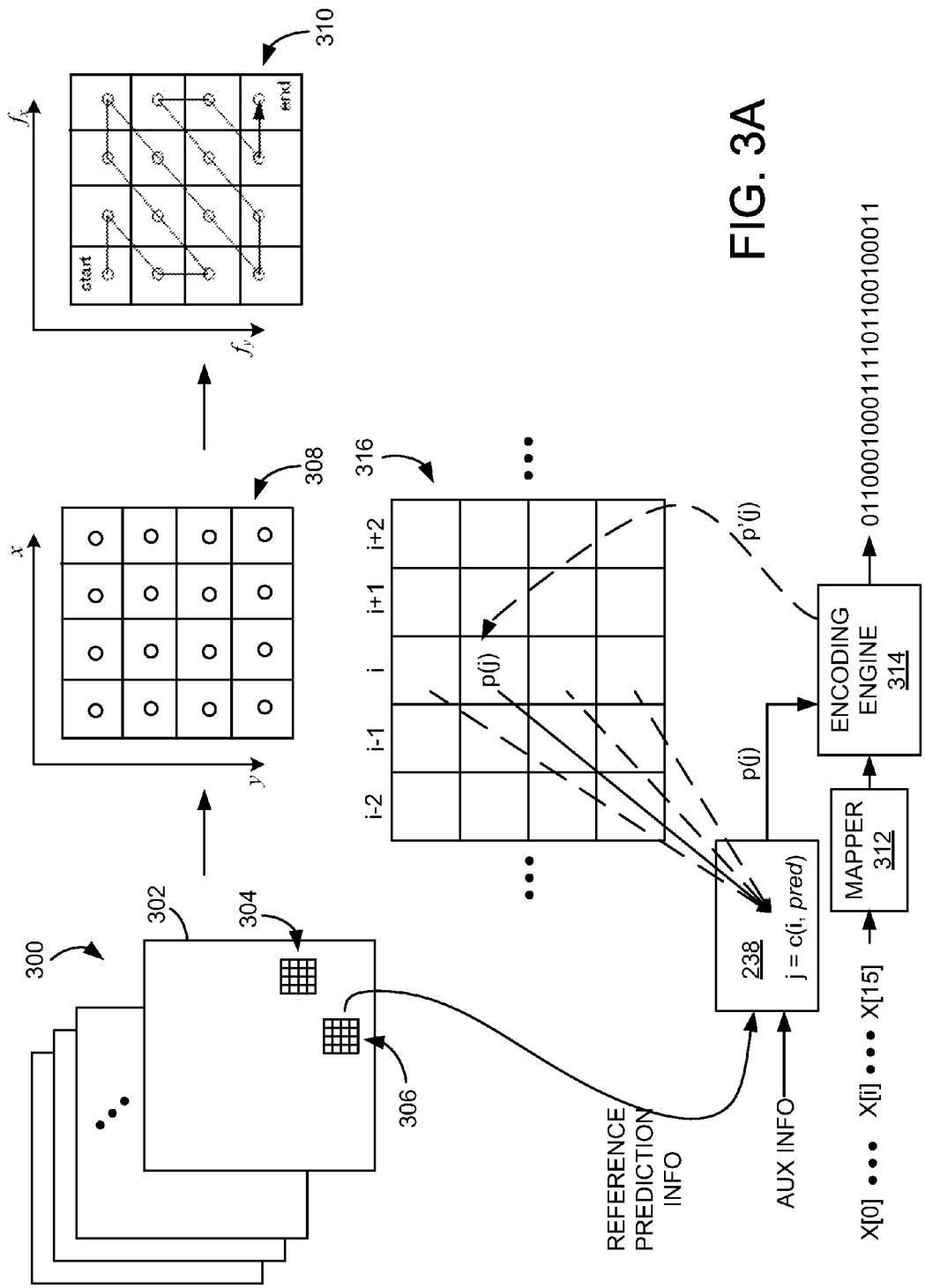
FIG. 3A is a schematic diagram of an exemplary encoding procedure.

Reference is now made to FIG. 3A, which shows a schematic diagram of an exemplary encoding procedure performed by an encoder (e.g., encoder 200) that uses entropy encoding (using any of a variety of types of lossless coding, such as arithmetic coding or Huffman coding) with context modeling based on information from reference blocks (e.g., from the reference processor 238) for encoding symbols generated from residual blocks. Alternatively, instead of entropy encoding, other exemplary encoding procedures could use lossy coding of coefficients of a symbols generated from residual blocks based on a corresponding reference blocks. A sequence of frames 300 is to be encoded. In some frames, such as frame 302, blocks of pixels are encoded based on similar reference blocks. In this example, a current block 304 is being encoded with respect to a reference block 306. The reference block 306 is in the same frame 302 as the current block 304, however, in other examples, the reference block 306 may be in a different frame from the frame 302 containing the current clock 304.

The encoder generates a residual block 308 by computing differences between pixel values in the current block 304 and respective pixel values in the reference block 306. The residual block 308 has the same spatial dimensions (along the x and y axes) as the current and reference blocks. In this example, these blocks are 4×4 blocks, so the encoder performs 16 subtraction operations to generate the residual block 308. Other block sizes may be used, but the sizes of the current and reference blocks are to generally be the same (i.e., they include the same total number of pixels and have the same number of pixels along the x and y dimensions). Thus, in the examples below, if other block sizes were used, the size of the residual block and corresponding blocks would be different (e.g., 8×8 blocks would yield 64 pixels in the residual block and 64 coefficients in the coefficient blocks described below).

The encoder performs a transform operation on the residual block 308 to generate a block of transform domain coefficients. The values of the transform coefficients are quantized (such that the values are rounded to the closest step size of a set of quantization step sizes) to yield a block of quantized transform coefficients 310. In some implementations, the quantization step size for each coefficient is selected dynamically, using a quantizer that is able to apply different step sizes to different coefficients. In the transform domain, the transform coefficients represent points along the dimensions $f_x$ and $f_y$ corresponding to different weights of corresponding spatial "basis patterns," and the $f_x$ and $f_y$ positions of those weights can be interpreted as spatial frequencies associated with those basis patterns. The encoder arranges the values in the block of coefficients 310 in a particular one-dimensional ordering according to a predetermined scanning pattern over the two dimensions of the 4×4 array of coefficients 310. FIG. 3A shows an exemplary zig-zag scanning order that can be used to generate a series of 16 coefficient values x[0], . . . , x[15]. Thus, the position index i of a given coefficient value x[i] within the (two-dimensional) block of coefficients represents a position in a one-dimensional ordering of the coefficients.

In order to perform entropy encoding on the coefficient values x[0], . . . , x[15], a mapper 312 maps the values onto one or more series of symbols. Each symbol can take on any of a predetermined set of values. For example, in some cases the symbols represent the lengths of zero runs and the terminating nonzero values, and in some cases (when the mapper 312 performs "binarization") the symbols are binary symbols (called "bins") that take on one of two possible values (e.g., "0" or "1"). When generating a series of bin values from coefficient values x[0], . . . x[i] . . . , x[15], in some cases there is a correspondence between bins and coefficients such that a given bin value bin[i] is related to a corresponding coefficient value x[i] with the same position index i in a predetermined manner. However, the correspondence is not necessarily a one-to-one correspondence. For example, for some values of i there may not be a corresponding bin value, and some bin values bin[i] may also depend on other coefficients in addition to x[i].

An entropy encoder (e.g., entropy encoder 226) then uses an encoding engine 314 to perform entropy encoding on each series of symbols. The encoding engine 314 accepts a series of symbols from the mapper 312 and accepts an estimated probability for each symbol from the reference processor 238. The encoding engine 314 is able to encode a series of symbols collectively as a unique binary value in a way that is reversible, such that the original symbols can be recovered exactly from that binary value. An example of such an encoding engine 314 is an arithmetic coder. By using an estimate of the probability that a particular one of the symbols will take on a particular value in the coding process, an arithmetic coder is able to represent the entire series of symbols with fewer bits than would be necessary to represent each symbol individually as a binary value. This compression is achieved, generally speaking, because more probable symbols correspond to shorter bit sequences within the binary value and less probable symbols correspond to longer bit sequences within the binary value. The more accurate the probability estimate is, the more efficient the compression is.

The encoding engine 314 operates in cooperation with the reference processor 238 to provide accurate probability estimates. At the start of encoding (and at the start of decoding), initial probability estimates are stored in storage locations (called "contexts") of a context data structure 316. The reference processor 238 retrieves a probability estimate p(j) stored at a location in the data structure 316 given by a context index j. The reference processor 238 determines the context index j for a given bin value bin[i] corresponding to a position index i as a function of a prediction pred based on reference information and the coefficient position i, such that the context index j=c(i, pred) has multiple possible values for a given value of i. Therefore, there are multiple possible probability estimates p(j) stored for a given value of i. In this example shown in FIG. 3A, there are four possible values of j for each value of i. Therefore, the reference processor 238 can retrieve any one of four possible values of a previously updated probability estimate for a given value of i, depending on the prediction pred. The reference information used to determine the prediction pred is based on the reference block 306 that was used to generate the residual block 308 for the current block of coefficients 310 being encoded, as described in more detail below.

Different probability estimates stored at different context indices are separately updated for successive residual blocks to provide more accurate estimates as based on past history as more residual blocks of a frame or series of frames are encoded. The encoding engine 314 overwrites the previous probability estimate p(j) with an updated probability estimate p'(j) computed based on the current bin value being encoded and the previous probability estimate p(j) (reflecting any past bin values). Because the context index j depends on reference block prediction information, the updated probability estimate also depends on reference block prediction information. The next time a particular updated probability is used, it represents an estimated probability that is conditioned on both information about previously coded bin values and reference information. Optionally, different values of j can be computed for different values of other auxiliary information (e.g., the type of frame or block or bin value being encoded) by providing an offset that is added to the context index j that depends on that auxiliary information. An exemplary procedure for updating the probability estimates is described in more detail in Marpe et al. "Context-Based Adaptive Binary Arithmetic Coding in the H.264/AVC Video Compression Standard," IEEE Transactions on Circuits and Systems for Video Technology, Vol. 13, No. 7, July, 2003, incorporated herein by reference. For other types of coding (e.g., lossless coding schemes such as Huffman coding or other entropy coding schemes, or lossy coding schemes) the coding information stored at various locations in the context data structure 316 does not necessarily need to be updated to take into account past history of previously encoded (or decoded) symbols.

In some implementations, the encoding engine 314 can use binary arithmetic coding (BAC) along with a binarization process performed by the mapper 312 in which the coefficient values x[0], . . . , x[15] are mapped into multiple different series of bins, including a "significance map" representing the non-zero coefficient values, a "last map" representing the position of the last non-zero coefficient, and a Unary/kth order Exp-Golomb binarization of absolute values of non-zero coefficients. To code each series of bins provided by the mapper 312, the encoding engine 314 can use a binary arithmetic code to generate a bitstream representing the bins, and a probability estimator to update probability estimates stored in the context data structure 316. As described above, each particular bin value is used by the encoding engine 314 (or a corresponding decoder) based on an a priori estimate of the probability of a particular bin taking on that particular value, where an adaptive arithmetic code allows this probability to be estimated on the fly. A probability estimator can be implemented as a Laplace estimator, a Kirchevsky-Trofimov estimator, or a finite-state machine, for example. For a finite-state implementation of a probability estimator, the probability is quantized to be one of a finite set of possible values (e.g., 64 possible values) and indexed by a state s, and probability estimation is performed based on state transitions. The state determines the probability estimates of the two possible symbols (in the case of binary bin values) and the next state depends on the value of the symbol most recently encoded (or decoded). In the following example, there are 64 possible states enumerated by s=0 . . . 63, each associated with a corresponding probability value $p_0 \ldots p_{63}$, where $p_0$=0.5, $p_s = \alpha p_{s-1}$, and $\alpha$ is a number close to but less than one (e.g., $\alpha \approx 0.95$). The probability of the least probable symbol (LPS) (e.g., either "0" or "1" for a binary bin value) is $p_s$ and the probability of the most probable symbol (MPS) is $1-p_s$. In this example, the probability $p_s$ gets closer to 0 as s gets closer to the largest value (63), and $p_s$, gets closer to 0.5 as s gets closer to the smallest value (0). So in the state s=0, (the "equiprobable state") the two possible symbol values are equally probable. Exemplary state transition vectors to transition to a next state s (given by the value in the vector) from a previous state s (used to index into the vector), according to the value of the most recently encoded (or decoded) symbol, are shown below.

If the most recently encoded (or decoded) symbol is the MPS, the transition vector is NextStateMPS[s]:
{1, 2, 3, 4, 5, 6, 7, 8,
9, 10,11,12,13,14,15,16,
17,18,19,20,21,22,23,24,
25,26,27,28,29,30,31,32,
33,34,35,36,37,38,39,40,
41,42,43,44,45,46,47,48,
49,50,51,52,53,54,55,56,
57,58,59,60,61,62,62,63}

If the most recently encoded (or decoded) symbol is the LPS, the transition vector is NextStateLPS[s]:
{0, 0, 1, 2, 2, 4, 4, 5,
6, 7, 8, 9, 9, 11,11,12,
13,13,15,15,16,16,18,18,
19,19,21,21,22,22,23,24,
24,25,26,26,27,27,28,29,
29,30,30,30,31,32,32,33,
33,33,34,34,35,35,35,36,
36,36,37,37,37,38,38,63}

So in this example, if the MPS is received, the probability estimate for receiving the MPS again increases until the last two states (s=62 or 63) in which case the probability estimate for receiving the MPS stays the same. If the LPS is received, the probability estimate for receiving the MPS decreases for most states except for the first and last states (s=0 or 63). If the current state is the equiprobable state and the LPS is received, the symbol values of the MPS and LPS are interchanged, otherwise, the symbol values of the MPS and LPS stay the same for all the other state transitions. Using a probability estimation procedure such as the procedure described above enables the probability estimate to depend on the values of past encoded (or decoded) symbols. Storing and updating probability estimates in different contexts (with different context indices), enables the probability estimates to also depend on information used to determine the contexts associated with the past symbols. Thus, by selecting different context indices for different values of selected reference information, the probability estimates can be made to depend on the selected reference information.

In other implementations, the encoding engine 314 can use other type of codes (other than an arithmetic code), such as a Huffman code or a variable-length-to-variable-length code. The other types of codes also use different contexts associated with different symbols for encoding a series of symbols. For example, in Huffman coding, instead of storing probability estimates, the contexts at different context indices store information for applying different codes for different symbols. Some codes may enable more efficient encoding for a symbol having a certain value of the prediction pred derived from reference information associated with that symbol.

To take advantage of the correlation between the reference block 306 and the residual block 308 (and the resulting bin value being encoded), the encoding engine 314 can determine coding information (e.g., the probability estimates for arithmetic coding or the code for Huffman coding) based in part on reference information derived from the reference block 306.

Any of a variety of techniques can be used to process the reference block 306 (e.g., using the reference processor 238) to generate reference information that is used by the encoding engine 314. For example, reference block prediction coefficients r[0], . . . , r[15] can be derived by applying the same transformation and quantization on reference block 306 that was applied to the residual block 308. In this example, there are 16 reference block prediction coefficients since the reference block 306 has the same number of pixels (16) as the residual block 308. The position index i associated with each reference block prediction coefficient r[i] can be determined using the same zig-zag scanning order used to determine the coefficient values x[0], . . . , x[15]. The computed reference block prediction coefficients r[i] can then be used in any of a variety of ways in the entropy coding (and decoding) process. In examples below, the context index j for a bin symbol is computed as a function of all the encoded history and the reference information (e.g., some function of the reference block prediction coefficients r[0], . . . , r[15]).

To encode a bin value bin[i] at a particular position index i, two different examples of possible context index computations are as follows:
j=4i+min ($\log_2$ (numPredSig+1),3)
j=4i+min ($\log_2$ (r[i]+1),3)
where numPredSig represents the number of non-zero coefficients in r[0], . . . , r[15], and r[i] is the value of prediction coefficient at the corresponding position index i. The bitstream resulting from the encoding process is decodable at a decoder that uses the same coding information stored in a corresponding context data structure using the same procedures for determining context indices. For example, in the case of arithmetic coding, the decoder is able to use the same initial probability estimates and the same procedure for updating probability estimates since the same reference block prediction coefficients r[0], . . . , r[15] can be generated at the decoder (using the reference processor 264) by performing a transform and quantization on a reference block recovered from encoded data received at the decoder (e.g., a reference block generated by adding a different reference block to a decoded residual block).

Figure 3B:
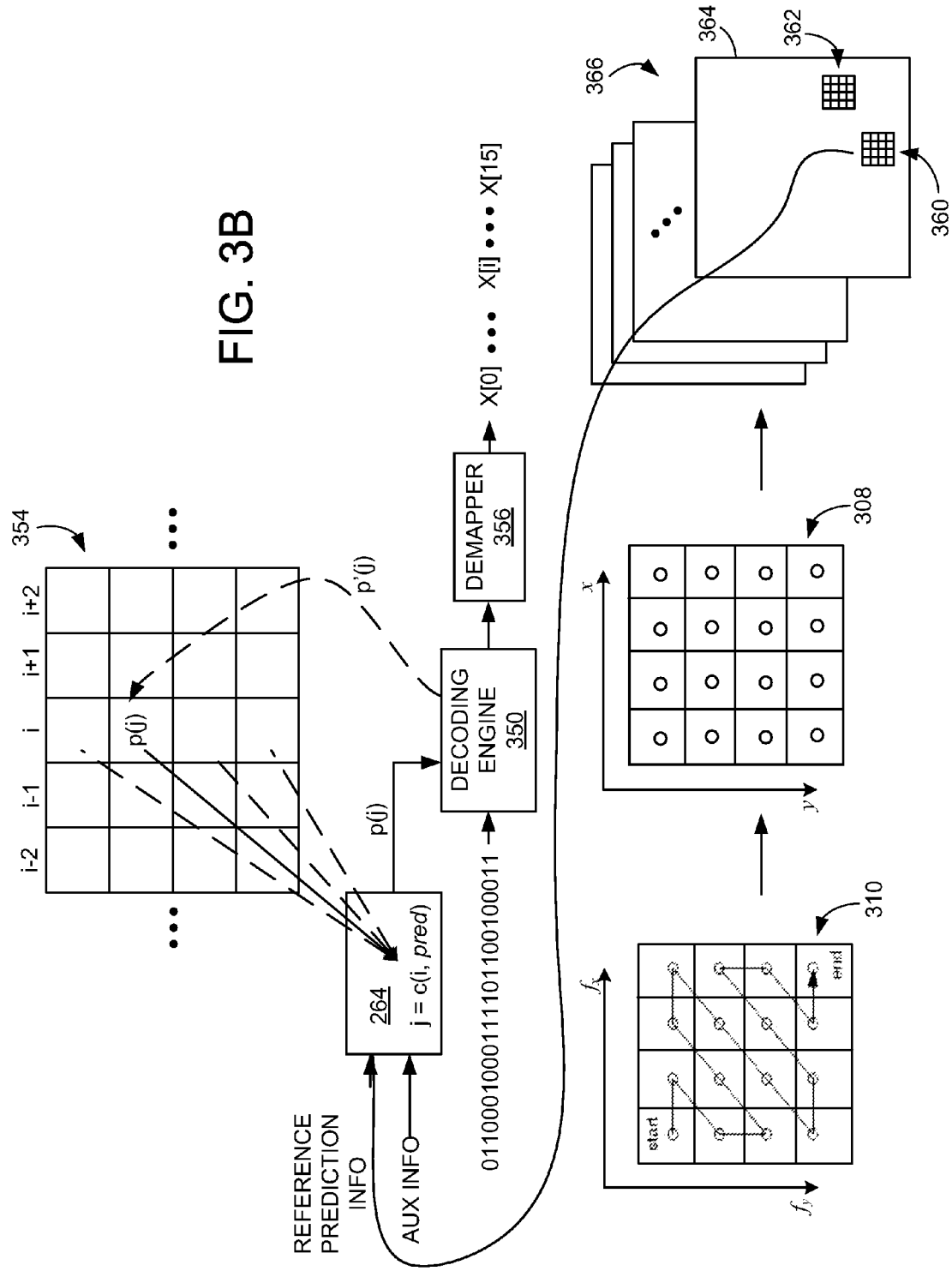
FIG. 3B is a schematic diagram of an exemplary decoding procedure.

Reference is now made to FIG. 3B, which shows a schematic diagram of an exemplary decoding procedure performed by decoder (e.g., decoder 250) that uses entropy decoding with context modelling based on information from reference blocks for decoding symbols used to recover residual blocks. For example, to decode an encoded bit sequence to recover a bin value bin[i] at a particular position index i, the reference processor 264 can use the same procedure used in the encoder (by reference to processor 238) to determine the context for bin[i] (at the context index j=c(i, pred)), and the coding information (e.g., estimated probability p(j)) associated with that context. The predictionpred is derived, for example, from reference information from a previously decoded reference block 360. An entropy decoder (e.g., entropy decoder 252) uses a decoding engine 350 to perform entropy decoding on a bitstream to recover a series of symbols, for example, a series of bins. The first bin for a particular sequence of bin values representing a residual block to be decoded is the bin that was first encoded at the encoder bin[0]. In the case of arithmetic coding, at the start of the decoding the initial probability estimates are the same initial probability estimate that were used at the encoder. After bin[i] is decoded, the probability estimate associated with the context used is updated by using the same probability estimation procedure as used in the encoder, where an exemplary procedure uses the finite state machine used for BAC described above. The decoding engine 350 is able to determine subsequent bin values bin[i] in a sequence of bin values from previously decoded bin values bin[0] ... bin[i−1], the corresponding probability estimate p(j), and the encoded bit sequence representing the residual block being decoded. The decoder is able to decode subsequent sequences of bin values bin[i] (e.g., for subsequent residual blocks) using the updated probability estimates.

The recovered series of symbols is then inverse mapped by a demapper 356 (e.g., by performing de-binarization) to generate the coefficient values x[0], . . . , x[15]. The block of quantized transform coefficients 310 is then recovered according to the same scanning order used at the encoder. After applying inverse quantization and an inverse transform, the residual block 308 is recovered. At the decoder, the recovered residual block 308 is added to the reference block 360 to yield the reconstructed block 362. In this example, the reconstructed block 362 is being decoded with respect to a reference block 360 in the same frame 364 as the reconstructed block 362, however, in other examples, the reference block 360 may be in a different frame from the frame 364 containing the reconstructed block 362 (e.g., an other previously decoded frame in a sequence of decoded frames 366).

In an example based on BAC, to encode the coefficients x[0], . . . , x[15], the mapper 312 first generates multiple series of bins representing different characteristics of the coefficients from which the coefficients can be reconstructed. For example, two of the series of bins are: a significance map sig[0], . . . , sig[15], and a last map last[0], . . . , last[15], where for any j, sig[j]=(x[j] !=0) and last[j]=(j==$L_x$), where $L_x$ denotes the position of the last non-zero coefficient in x[0], . . . , x[15]. Other series of bins include a "greater than one map" which indicates whether a coefficient's absolute value is greater than one, and various "level maps" that indicate whether a coefficient's absolute value is greater than a particular level. Some of the series of bins (not necessarily all of them) are losslessly encoded by the encoding engine 314. An exemplary procedure that can be used by the encoding engine 314 for performing arithmetic coding to encode the significance and last maps using contexts to store adaptively updated probability estimates is as follows.

```
for (i=0; i < 15; i++)
{
    assign context to estimate the probability for encoding sig[i];
    if (sig[i] ==1)
    {
        assign context to estimate the probability for encoding last[i];
        terminate the encoding of the significance map if (i==Lx);
    }
}
```

An exemplary procedure that can be used by the encoding engine 314 for performing arithmetic coding to encode the "greater than one" and level maps of significant coefficients after the encoding of the significance and last maps is as follows.

```
c1 = 1; c2=0;
for (i=Lx; i >= 0; i--)
{
    if (sig[i]==1)
    {
        assign context to encode (abs(x[i])==1);
        if (abs(x[i]) > 1)
        {
            c1 = 0;
            assign context to encode the level of x[i]−2;
```

-continued

```
            c2++;
        } else
        {
            if (c1 > 0)
                c1++;
        }
    }
}
```

The steps of assigning a context for encoding a given value are performed using the reference processor 238, and the steps of estimating updated probabilities to be associated with the assigned context are performed using the probability estimator 316, as described above.

Additional examples of possible context index computations for the different series of bin values, including offsets associated with different series of bin values, are as follows.

j=ctx_sig_offset+4i+min($\log_2$(r[i]+1), 3) for sig[i]

j=ctx_last_offset+4i+min($\log_2$(numPredSig+1), 3)) for last[i]

j=ctx_greone_offset+4 min(c1,4)+min($\log_2$(r[i]+1), 3) for (abs(x[i])==1)

j=context_level_offset+4 min(c2,4)+min($\log_2$(r[i]+1), 3) for level of x[i]−2

The following tables show exemplary values of a quantized 4×4 transform coefficient block generated from a particular residual block, and a corresponding prediction coefficient block generated from the reference block that was used to generate the particular residual block. The following example illustrates various operations in an encoding procedure that uses some of the techniques described herein.

Coefficient Block

| | | | |
|---|---|---|---|
| −16 | −1 | 0 | 0 |
| −4 | 0 | 0 | 0 |
| 0 | 1 | 0 | 0 |
| −1 | 1 | 0 | 0 |

Prediction Coefficient Block

| | | | |
|---|---|---|---|
| 49 | 0 | 0 | 0 |
| −4 | 0 | 0 | 0 |
| −1 | 0 | 0 | 0 |
| −2 | 0 | 0 | 0 |

The following table shows values of the position index, the absolute values of the residual transform coefficients, the signs of the residual transform coefficients, and the prediction coefficients.

Zigzag Scan

| | index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| \|x\| | 16 | 1 | 4 | 0 | 0 | 0 | 0 | 0 | 1 | 1 | 1 | 0 | 0 | 0 | 0 | 0 |
| sign | − | − | − | | | | | | + | − | + | | | | | |
| pred | 49 | 0 | 4 | 1 | 0 | 0 | 0 | 0 | 0 | 2 | 0 | 0 | 0 | 0 | 0 | 0 |

The signs can be encoded separately without context probability estimates. Therefore, only the absolute values of the residual transform coefficients will be considered in this example.

The following table additionally shows values of the significance map and the last map in their corresponding index positions.

Significance and Last Maps

| | index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| \|x\| | 16 | 1 | 4 | 0 | 0 | 0 | 0 | 0 | 1 | 1 | 1 | 0 | 0 | 0 | 0 | 0 |
| pred | 49 | 0 | 4 | 1 | 0 | 0 | 0 | 0 | 0 | 2 | 0 | 0 | 0 | 0 | 0 | 0 |
| sig | 1 | 1 | 1 | 0 | 0 | 0 | 0 | 0 | 1 | 1 | 1 | | | | | |
| last | 0 | 0 | 0 | | | | | | 0 | 0 | 1 | | | | | |

Some index positions for these maps do not have corresponding values if those values are not needed to fully represent the information in the map. For example, only those index positions with a value of sig=1 have a last map value, since the meaning of the last map is whether the corresponding value is the last non-zero coefficient.

To encode the significance map, the context index j for retrieving the probability estimate p(j)=sig_p[j] is: j=4*i+min (floor($\log_2$(r[i]+1)),3).

To encode the last map, the context index j for retrieving the probability estimate p(j)=last_p[j] is: j=4*i+min(floor($\log_2$ (numPredSig+1)),3).

In this example, the number of non-zero coefficients in the prediction coefficient block is given by numPredSig=4.

The significance and last maps can then be encoded using the following sequence of operations, where each row represents a different value of i for one of the maps, and includes providing the pair of values (map[i], p(j)) to an arithmetic code engine (e.g., implemented using the encoding engine 314) and updating the probability p(i):

(1,sig_p[4*0+3])→arithmetic code engine→update sig_p[4*0+3]
(0,last_p[4*0+2])→arithmetic code engine→update last_p[4*0+2]
(1,sig_p[4*1+0])→arithmetic code engine→update sig_p[4*1+0]
(0,last_p[4*1+2])→arithmetic code engine→update last_p[4*1+2]
(1,sig_p[4*2+2])→arithmetic code engine→update sig_p[4*2+2]
(0,last_p[4*2+2])→arithmetic code engine→update last_p[4*2+2]
(0,sig_p[4*3+0])→arithmetic code engine→update sig_p[4*3+0]
(0,sig_p[4*4+0])→arithmetic code engine→update sig_p[4*4+0]
(0,sig_p[4*5+0])→arithmetic code engine→update sig_p[4*5+0]
(0,sig_p[4*6+0])→arithmetic code engine→update sig_p[4*6+0]
(0,sig_p[4*7+0])→arithmetic code engine→update sig_p[4*7+0]
(1,sig_p[4*8+0])→arithmetic code engine→update sig_p[4*8+0]
(0,last_p[4*8+2])→arithmetic code engine→update last_p[4*8+2]
(1,sig_p[4*9+1])→arithmetic code engine→update sig_p[4*9+1]
(0,last_p[4*9+2])→arithmetic code engine→update last_p[4*9+2]
(1,sig_p[4*10+0])→arithmetic code engine→update sig_p[4*10+0]
(1,last_p[4*10+2])→arithmetic code engine→update last_p[4*10+2]

Figure 4A:
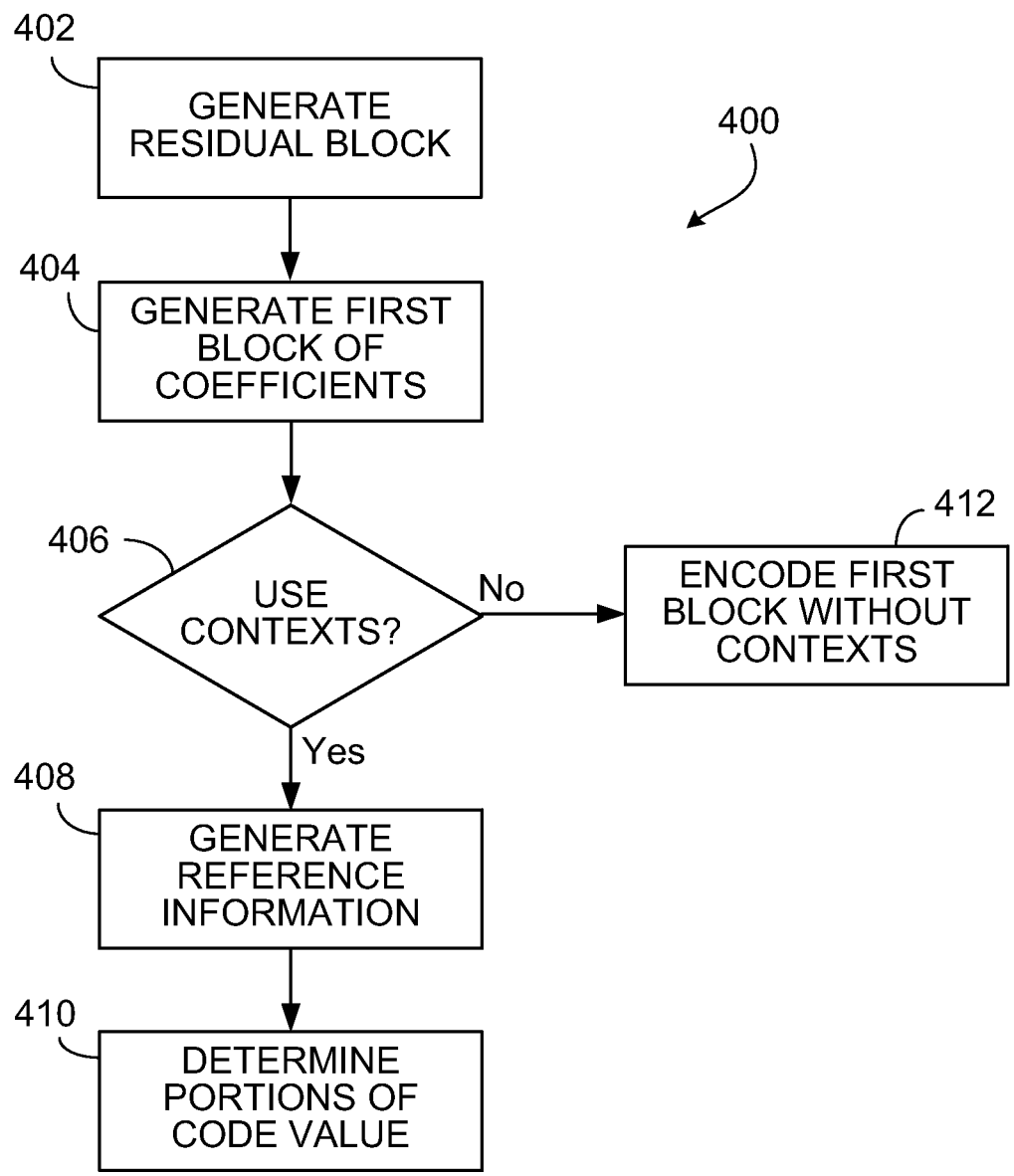
FIG. 4A is a flowchart of an exemplary encoding procedure.

FIG. 4A shows a flowchart for an exemplary encoding procedure 400 for encoding input data, which may be part of a procedure performed by an encoder (e.g., encoder 200) that includes additional steps not shown. The procedure 400 includes generating (402) a first block of coefficients (e.g., x[0], . . . , x[15]) based on a transform performed on a residual block of data for multiple pixels. The encoder determines (404) whether symbols representing the first block of coefficients are to be encoded using different contexts for different symbols based on reference information. If so, then the encoder generates (406) reference information based on a reference block of data corresponding to the residual block of data; and determines (408) losslessly decodable code values representing the first block of coefficients based on the reference information. If not, then the encoder encodes (410) the first block of coefficients without using different contexts for different symbols based on reference information.

Figure 4B:
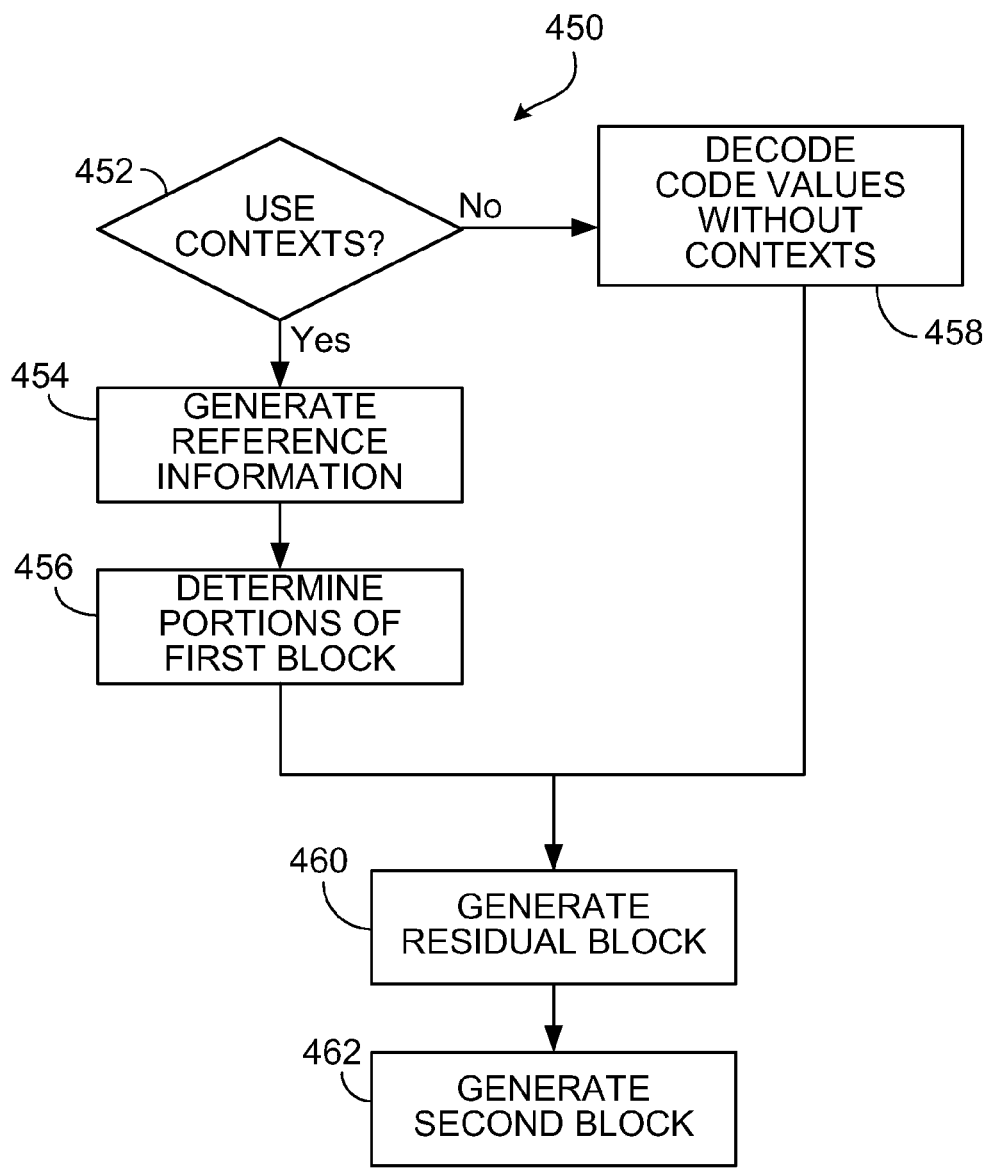
FIG. 4B is a flowchart of an exemplary decoding procedure.

FIG. 4B shows a flowchart for an exemplary decoding procedure 450 for decoding encoded input data including one or more code values, which may be part of a procedure performed by an decoder (e.g., decoder 250) that includes additional steps not shown. The decoder determines (452) whether the code values are to be decoded into symbols for a first block of coefficients (e.g., x[0], . . . , x[15]) using different contexts for different symbols based on reference information. If so, then the decoder generates (454) reference information (e.g., r[0], . . . , r[15]) based on a reference block of data corresponding to a residual block of data, and losslessly decodes (456) code values to generate a first block of coefficients based on the reference information. If not, then the decoder decodes (458) the code values without using different contexts for different symbols based on reference information. The procedure 450 also includes generating (460) the residual block of data based on an inverse-transform to performed on the first block of coefficients, and generating (462) a block of data for multiple pixels in a reconstructed frame based on a sum of the reference block of data and the residual block of data.

Figure 5A:
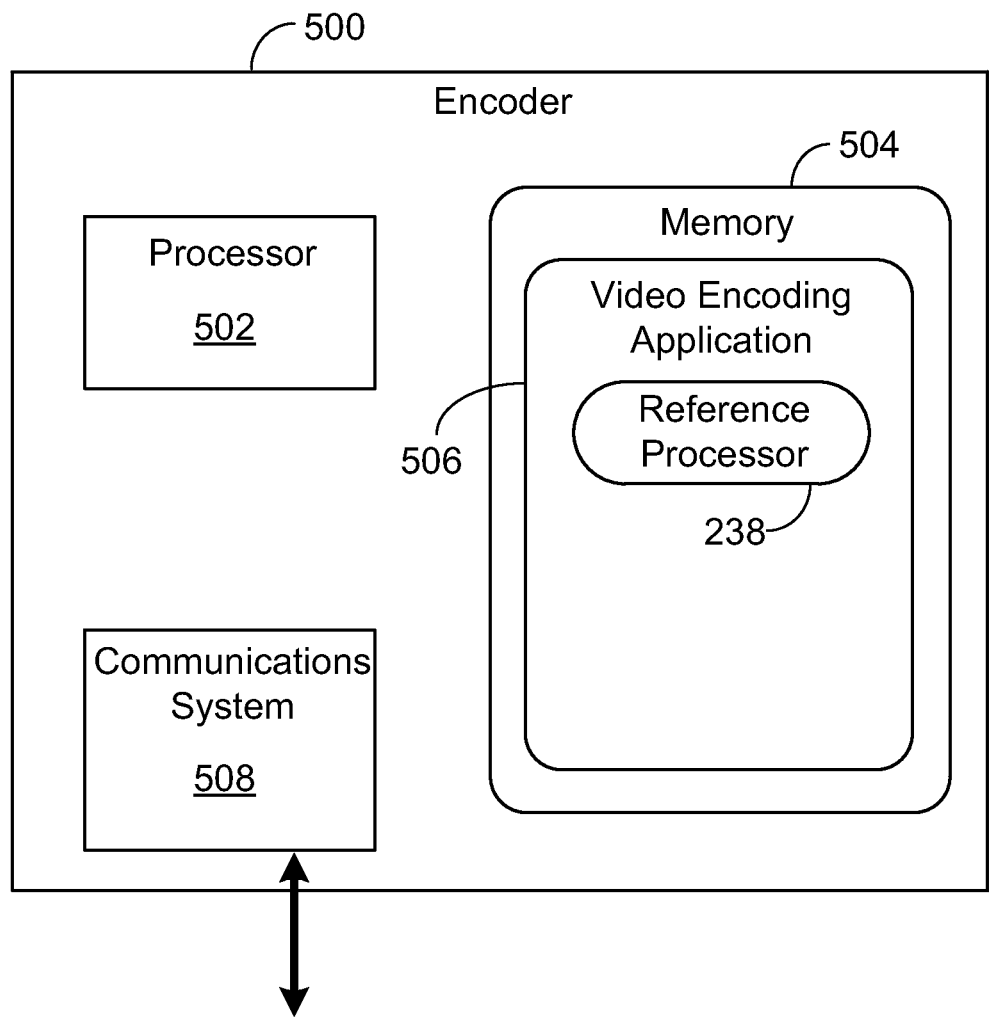
FIG. 5A is a block diagram of an exemplary encoder apparatus.

Reference is now made to FIG. 5A, which shows a simplified block diagram of an example embodiment of an encoder 500. The encoder 500 includes a processor 502, a memory 504 accessible by the processor 502, and an encoding application 506. The encoding application 506 may include a computer program or application stored in the memory 504 and containing instructions for configuring the processor 502 to perform steps or operations such as those described herein. The encoding application 506 may include one or more components or modules for performing various aspects of the techniques described herein. For example, a reference processor 238, as described herein, can be included as a module of the encoding application 506. The encoding application 506, or any of its modules, may be stored in any combination of the memory 504 of the encoder 500, and any other accessible computer readable storage medium, such as a compact disc, flash memory device, random access memory, hard drive, etc. The encoder 500 also includes a communications interface 508 accessible by the processor 502 to transmit a bitstream comprising encoded video data generated by the processor 502 executing the encoding application 506.

Figure 5B:
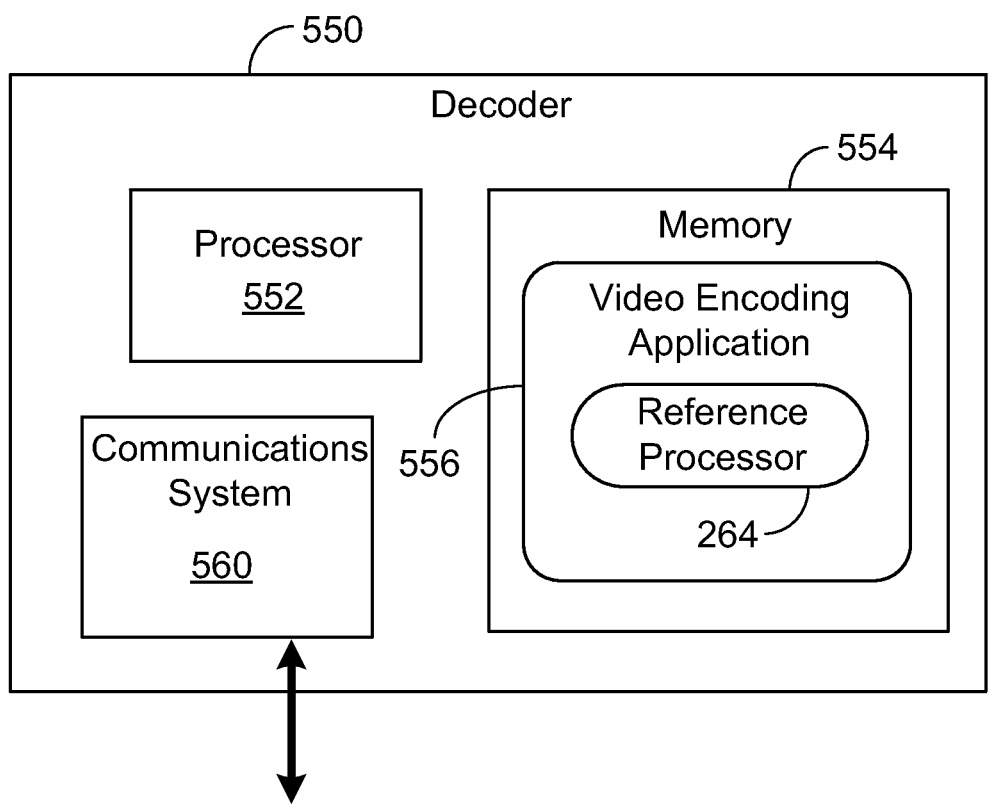
FIG. 5B is a block diagram of an exemplary decoder apparatus.

Reference is now also made to FIG. 5B, which shows a simplified block diagram of an example embodiment of a decoder 550. The decoder 550 includes a processor 552, a memory 554, and a decoding application 556. The decoding application 556 may include a computer program or application stored in the memory 554 and containing instructions for configuring the processor 552 to perform steps or operations such as those described herein. The decoding application 556 may include one or more components or modules for performing various aspects of the techniques described herein. For example, a reference processor 264, as described herein, can be included as a module of the decoding application 556. The reference processor 264 is configured to perform computations corresponding to those performed by the reference processor 238 that was used to encode the video data that is being decoded. For example, the reference processor 264 adaptively updates the context model including the estimated probabilities stored in the contexts for performing arithmetic decoding, based in part on information from reference blocks, as described herein. The decoding application 556, or any of its modules, may be stored in any combination of the memory 554 of the decoder 550, and any other accessible computer readable storage medium, such as a compact disc, flash memory device, random access memory, hard drive, etc. The decoder 550 also includes a communications interface 560 accessible by the processor 552 to receive a bitstream comprising encoded video data to be decoded by the processor 552 executing the decoding application 556.

The decoder and/or encoder may be implemented in a number of computing devices, including, without limitation, servers, suitably programmed general purpose computers, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The techniques described herein are not limited to particular processors, computer languages, computer programming conventions, data structures, or other such implementation details. The described processes may be implemented as a part of computer-executable code stored in volatile or non-volatile memory, as part of an application-specific integrated chip (ASIC), etc.

In one aspect, in general, encoding input data includes: generating a first block of coefficients based on a transform performed on a residual block of data for multiple pixels; generating reference information based on a reference block of data corresponding to the residual block of data; and determining losslessly decodable code values representing the first block of coefficients based on the reference information.

Aspects can include one or more of the following features.

For example, determining losslessly decodable code values representing the first block of coefficients based on the reference information may include determining portions of a code value representing respective portions of the first block of coefficients based on at least one value derived from at least a portion of the reference information. Determining the portions of the code value representing respective portions of the first block of coefficients based on at least one value derived from at least a portion of the reference information may include determining the portions based on respective estimated probabilities estimated according to: one or more previously determined code values, and the at least one value.

The estimated probability for determining a first portion of the code value is based on a value stored in a data structure at a location identified by an index that depends on: a position within the first block of coefficients, and the at least one value. The position within the first block of coefficients comprises a position in a one-dimensional ordering of the coefficients in the first block of coefficients. A value stored at a first location in the data structure may be updated based on: a value previously stored at the first location associated with the one or more previously determined code values, and a value of a symbol representing a portion of the first block of coefficients. The estimated probability for determining a first portion of the code value may include a conditional probability that a symbol representing a portion of the first block of coefficients has a particular symbol value given the one or more previously determined code values and the at least one value.

The symbol representing a portion of the first block of coefficients may include a binary symbol determined according to a value of a coefficient in the first block of coefficients in a particular position with respect to a transform domain of the transform performed on the residual block. The reference information based on the reference block of data may include a second block of coefficients based on a transform performed on the reference block of data. The at least one value according to which a particular probability is being estimated may include a value based on a coefficient in the second block of coefficients that has a position within the second block of coefficients that corresponds to a position of a coefficient within the first block of coefficients for which the particular probability is being estimated.

The at least one value may include a value based on a number of non-zero coefficients in the second block of coefficients. Generating the first block of coefficients based on a transform performed on the residual block may include quantizing values resulting from the transform. Generating the second block of coefficients based on a transform performed on the reference block of data may include quantizing values resulting from the transform. The respective portions of the first block of coefficients may include a series of symbols, with each symbol having a value determined by at least one coefficient of the first block of coefficients.

The symbols are binary symbols each having one of two possible values. The to respective portions of the first block of coefficients may include a series of symbols, with each symbol having a value determined by at least one coefficient of the first block of coefficients. The code value representing the respective portions of the first block of coefficients may include an arithmetic code value generated based on the series of symbols and the respective estimated probabilities. Each of the series of symbols has a symbol value that is associated with a corresponding one of the respective estimated probabilities. A set of codewords for losslessly decoding at least one of the code values is based on information stored in a data structure at a location identified by an index that depends on: a position within the first block of coefficients, and the at least one value.

The position within the first block of coefficients includes a position in a one-dimensional ordering of the coefficients in the first block of coefficients. The losslessly decodable code values are determined using a coding scheme selected from the group consisting of: arithmetic coding, and Huffman coding.

In another aspect, in general, decoding encoded input data including one or more code values includes: generating reference information based on a reference block of data corresponding to a residual block of data; losslessly decoding code values to generate a first block of coefficients based on the reference information; generating the residual block of data based on an inverse-transform performed on the first block of coefficients; and generating a block of data for multiple pixels in a reconstructed frame based on a sum of the reference block of data and the residual block of data.

Aspects can include one or more of the following features. For example, losslessly decoding code values to generate a first block of coefficients based on the reference information may include determining portions of a first block of coefficients based on respective portions of a received code value and at least one value derived from at least a portion of the reference information. Determining the portions of the first block of coefficients based on respective portions of a received code value and at least one value derived from at least a portion of the reference information may include determining the portions based on respective estimated probabilities estimated according to: one or more previously decoded code values, and the at least one value.

The estimated probability for determining a first portion of the first block of coefficients is based on a value stored in a data structure at a location identified by an index that depends on: a position within the first block of coefficients, and the at least one value. The position within the first block of coefficients may include a position in a one-dimensional ordering of the coefficients in the first block of coefficients.

A value stored at a first location in the data structure may be updated based on: a value previously stored at the first location associated with the one or more previously decoded code values, and a value of a symbol representing the first portion of the first block of coefficients. The estimated probability for determining a first portion of the first block of coefficients comprises a conditional probability that a symbol representing the first portion of the first block of coefficients has a particular symbol value given the one or more previously decoded code values and the at least one value. The symbol representing the first portion of the first block of coefficients may include a binary symbol determined according to a value of a coefficient in the first block of coefficients in a particular position with respect to a transform domain of the first block of coefficients. The reference information may be based on the reference block of data comprises a second block of coefficients based on a transform performed on the reference block of data. The at least one value according to which a particular probability is being estimated may include a value based on a coefficient in the second block of coefficients that has a position within the second block of coefficients that corresponds to a position of a coefficient within the first block of coefficients for which the particular probability is being estimated.

The at least one value may include a value based on a number of non-zero coefficients in the second block of coefficients. A set of codewords for losslessly decoding at least one of the code values is based on information stored in a data structure at a location identified by an index that depends on: a position within the first block of coefficients, and the at least one value. The position within the first block of coefficients may include a position in a one-dimensional ordering of the coefficients in the first block of coefficients.

The code values are decoded using a coding scheme selected from the group consisting of: arithmetic coding, and Huffman coding.

Aspects can have one or more of the following advantages.

Before the entropy encoding process, the quantized transform coefficients are represented as a series of symbols (e.g., binary symbols). A context model enables a current symbol to be encoded according to a probability estimated based on contextual information derived from previously encoded video data. The contextual to information can be stored in a number of contexts (e.g., each context can correspond to a different storage location in a data structure). In order to achieve high compression efficiency in the entropy encoding, it is helpful to use a large amount of contextual information to estimate the probability. However, when the number of contexts is large in comparison to available data, a potential problem called "context dilution" may significantly degrade the compression efficiency. Context dilution may result, for example, from avoiding a probability estimate of zero in some coding techniques. In a typical case of video compression, the quantized transform coefficients may vary greatly in size and range, posing potential challenges in designing an efficient context model. The techniques described herein facilitate balancing the number of contexts and the compression efficiency.

Other features and advantages of the invention are apparent from the present description, and from the claims.

Certain adaptations and modifications of the described embodiments can be made. Therefore, the above discussed embodiments are considered to be illustrative and not restrictive.

What is claimed is:

1. A method for decoding encoded input data including one or more code values, the method comprising:
   generating reference information based on a reference block of data corresponding to a residual block of data;

losslessly decoding code values to generate a first block of coefficients based on the reference information, wherein losslessly decoding code values to generate a first block of coefficients based on the reference information comprises determining portions of a first block of coefficients based on respective portions of a received code value and at least one value derived from at least a portion of the reference information;

generating the residual block of data based on an inverse-transform performed on the first block of coefficients; and generating a block of data for multiple pixels in a reconstructed frame based on a sum of the reference block of data and the residual block of data.

2. The method of claim 1, wherein determining the portions of the first block of coefficients based on respective portions of a received code value and at least one value derived from at least a portion of the reference information comprises determining the portions based on respective estimated probabilities estimated according to:

one or more previously decoded code values, and the at least one value.

3. The method of claim 2, wherein the estimated probability for determining a first portion of the first block of coefficients is based on a value stored in a data structure at a location identified by an index that depends on: a position within the first block of coefficients, and the at least one value.

4. The method of claim 3, wherein the position within the first block of coefficients comprises a position in a one-dimensional ordering of the coefficients in the first block of coefficients.

5. The method of claim 3, further comprising updating a value stored at a first location in the data structure based on: a value previously stored at the first location associated with the one or more previously decoded code values, and a value of a symbol representing the first portion of the first block of coefficients.

6. The method of claim 2, wherein the estimated probability for determining a first portion of the first block of coefficients comprises a conditional probability that a symbol representing the first portion of the first block of coefficients has a particular symbol value given the one or more previously decoded code values and the at least one value.

7. The method of claim 6, wherein the symbol representing the first portion of the first block of coefficients comprises a binary symbol determined according to a value of a coefficient in the first block of coefficients in a particular position with respect to a transform domain of the first block of coefficients.

8. The method of claim 2, wherein the reference information based on the reference block of data comprises a second block of coefficients based on a transform performed on the reference block of data.

9. The method of claim 8, wherein the at least one value according to which a particular probability is being estimated comprises a value based on a coefficient in the second block of coefficients that has a position within the second block of coefficients that corresponds to a position of a coefficient within the first block of coefficients for which the particular probability is being estimated.

10. The method of claim 8, wherein the at least one value comprises a value based on a number of non-zero coefficients in the second block of coefficients.

11. The method of claim 1, wherein a set of codewords for losslessly decoding at least one of the code values is based on information stored in a data structure at a location identified by an index that depends on: a position within the first block of coefficients, and the at least one value.

12. The method of claim 11, wherein the position within the first block of coefficients comprises a position in a one-dimensional ordering of the coefficients in the first block of coefficients.

13. The method of claim 1, wherein the code values are decoded using a coding scheme selected from the group consisting of: arithmetic coding, and Huffman coding.

14. A non-transitory computer readable storage medium storing a computer program for decoding encoded input data including one or more code values, the computer program including instructions for causing a computer system to:

generate reference information based on a reference block of data corresponding to a residual block of data;

losslessly decode code values to generate a first block of coefficients based on the reference information, wherein instructions to losslessly decode code values to generate a first block of coefficients based on the reference information comprises instructions to determine portions of a first block of coefficients based on respective portions of a received code value and at least one value derived from at least a portion of the reference information;

generate the residual block of data based on an inverse-transform performed on the first block of coefficients; and generate a block of data for multiple pixels in a reconstructed frame based on a sum of the reference block of data and the residual block of data.

15. An apparatus for decoding encoded input data including one or more code values, the apparatus comprising:

a memory configured to buffer one or more frames reconstructed from the input data; and at least one processor coupled to the memory and configured to process the input data based on the one or more frames buffered in the memory, the processing including:

generating reference information based on a reference block of data corresponding to a residual block of data;

losslessly decoding code values to generate a first block of coefficients based on the reference information, wherein losslessly decoding code values to generate a first block of coefficients based on the reference information comprises determining portions of a first block of coefficients based on respective portions of a received code value and at least one value derived from at least a portion of the reference information;

generating the residual block of data based on an inverse-transform performed on the first block of coefficients; and generating a block of data for multiple pixels in a reconstructed frame based on a sum of the reference block of data and the residual block of data.

* * * * *